(12) United States Patent
Shimizu et al.

(10) Patent No.: US 7,717,789 B2
(45) Date of Patent: May 18, 2010

(54) GAME PROGRAM, GAME DEVICE, AND GAME METHOD

(75) Inventors: Mitomu Shimizu, Tokyo (JP); Hiroshi Tanibuchi, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 297 days.

(21) Appl. No.: 11/555,282

(22) Filed: Nov. 1, 2006

(65) Prior Publication Data

US 2007/0060389 A1 Mar. 15, 2007

Related U.S. Application Data

(63) Continuation of application No. PCT/JP2005/008010, filed on Apr. 27, 2005.

(30) Foreign Application Priority Data

May 1, 2004 (JP) .............................. 2004-163865

(51) Int. Cl.
*A63F 13/00* (2006.01)
*A63F 9/24* (2006.01)

(52) U.S. Cl. ............................ 463/30; 463/31; 463/32; 463/33

(58) Field of Classification Search .................. 463/1, 463/31, 30–33, 43, 74
See application file for complete search history.

(56) References Cited

U.S. PATENT DOCUMENTS

| 5,354,202 | A | * | 10/1994 | Moncrief et al. ............... 434/69 |
| 6,231,443 | B1 | | 5/2001 | Asai et al. |
| 6,699,127 | B1 | * | 3/2004 | Lobb et al. ..................... 463/43 |
| 7,214,133 | B2 | * | 5/2007 | Jen et al. ........................ 463/42 |
| 2002/0123380 | A1 | | 9/2002 | Hirai et al. |

FOREIGN PATENT DOCUMENTS

| AU | 768349 B2 | 3/2002 |
| JP | 3209988 B2 | 7/2001 |
| JP | 3227447 B2 | 8/2001 |

* cited by examiner

*Primary Examiner*—Dmitry Suhol
*Assistant Examiner*—Robert Mosser
(74) *Attorney, Agent, or Firm*—Global IP Counselors, LLP (57) ABSTRACT

The present invention provides a player with replay images without setting a reference value to the replay images. First, in a game implemented by a program of the present invention, a first event table that identifies event content and the importance level thereof, is set. Next, replay images of an event that occurred during the execution of the game are saved in the memory unit. Then, the first event table is referenced during execution of the game, and the importance level of the replay images saved in the memory unit is set. Next, a second event table used to identify the importance level of the replay images is set. Finally, at least either the latest replay images saved in the memory unit, or the replay images saved in the memory unit in accordance with the importance level of the replay image, or both, is displayed on a monitor.

8 Claims, 6 Drawing Sheets

| |
|---|
| "walk-off victory" |
| "moment in which all-time record was achieved" |
| "shutout" |
| "completed game" |
| "hitting a come-from behind home run when losing" |
| "sending a come-from behind hit when losing" |
| "hitting a home run when the score is tied" |
| "hitting a come-from behind hit when the score is tied" |
| "hitting a score-tying home run when losing" |
| "scoring point(s) to even the score when losing" |
| "failing to tie come-from behind when losing" |
| "failing to the game when losing" |
| "failing to get a go-ahead run when the score is tied" |
| "a home run not classified above" |
| "hitting a triple" |
| "hitting a double" |
| "sending a hit" |
| "hitting a sacrifice fly" |
| "hitting a sacrifice hit" |
| "error" |
| "out" |

| 5 | "hitting a come-from behind home run |
|---|---|
| 11 | "failing to come-from behind when loosing" |
| 13 | "failing to go ahead when the score is tied" |

Fig. 6

GAME PROGRAM, GAME DEVICE, AND GAME METHOD

CROSS-REFERENCE TO RELATED APPLICATIONS

This application is a continuation of International Application No. PCT/JP2005/008010 that was filed on Apr. 27, 2005, and claims priority to Japan Patent Application No. 2004-163865 that was filed on May 1, 2004. The entire disclosures of International Application No. PCT/JP2005/008010 and Japan Patent Application No. 2004-163865 are hereby incorporated herein by reference.

BACKGROUND OF THE INVENTION

1. Field of the Invention

The preset invention relates to a game program, particularly to a game program for implementing a game in which a replay image corresponding to various events can be displayed on a monitor in a computer. Furthermore, the present invention relates to a game device and a game method implemented with this game program.

2. Background Information

Various games have been proposed in the past, and one of them is a game in which replay images corresponding to various events can be displayed on a monitor. For example, in some competitive sports games, play types are set in order to identify the content of plays. These play types are grouped by, for example, the actions in plays performed during the execution of the game, and the results of plays performed during the execution of the game. Taking a baseball game for example, the play types include actions and results such as "the batter will get a hit/has gotten a hit," "the runner will steal/has stolen a base," "the fielder will make/has made an error," and the like. When plays corresponding to these play types occur, evaluation points will be awarded to each play in accordance with the quality of the play. Here, a high evaluation score will be awarded, for example, to a skillful play, a play having a high level of difficulty, and a timely play. In addition, replay images will be generated for a play when a predetermined evaluation score or greater is awarded. Because of this, replay images of a play to which a predetermined evaluation score or greater has been awarded will be displayed as the latest replay images on a monitor immediately after the play has occurred, and replay images comprised of a plurality of replay images of plays for which a predetermined evaluation score or was awarded will be displayed as highlight replay images on a monitor (see Japan Patent No. 3227447).

In a conventional game, particularly in a game in which replay images corresponding to various events can be displayed on a monitor, the actions in plays performed during the execution of a game, and the results of plays performed during the execution of a game, will be arranged in groups, and if a play corresponding to these types of play occurs, an evaluation score will be awarded to each play in accordance with the result of the play. In addition, replay images will be generated of a play in which a predetermined evaluation score or more has been awarded. Thus, in a game in which replay images are generated for a play to which a predetermined evaluation score or greater has been awarded, replay images will not be generated for a play in which an evaluation score that is less than a predetermined value has been awarded, and thus a problem could occur in which the latest replay images of a play cannot be provided to a player immediately after the play. In addition, a problem could occur in which highlight replay images cannot be provided to a player after a sufficient number of games. It is thought that the threshold of the evaluation score must be sufficiently low in order to solve this problem. However, if the threshold is set to be low, the number of replay images that will be saved in a memory unit will increase, and thus there is a possibility that the volume of the replay images will fill the free space in the memory unit. Therefore, the inventor of the present application formulated a method by which replay images such as the latest replay images, highlight replay images, and the like, can be provided to a player without using a method in which a reference value, such as an evaluation score, is set.

In view of the above, it will be apparent to those skilled in the art from this disclosure that there exists a need to provide a player with replay images without setting a reference value for the replay images. This invention addresses this need in the art as well as other needs, which will become apparent to those skilled in the art from this disclosure.

SUMMARY OF THE INVENTION

A game program in accordance with a first aspect is a game program for implementing the following functions in a computer that can implement a game in which replay images corresponding to various events can be displayed on a monitor.

A first event table setting function for setting a first event table in order to identify event content and the importance level of event content;

A second event table setting function for saving replay images of an event in a memory unit that has occurred during the execution of the game, setting the importance level of the replay images saved in the memory unit by referencing the first event table during the execution of the game, and setting a second event table for identifying the importance level of the replay images; and A replay image displaying function for displaying at least either the latest replay images that are saved in the memory unit, or the replay images that were saved in the memory unit in accordance with the importance level of the replay image, or both.

First, in a game implemented by the present program, the first event table setting function sets the first event table in order to identify event content and identify the importance level thereof. Next, the second event table setting function saves replay images of an event that has occurred during the execution of the game in the memory unit. Then, the first event table is referenced during the execution of the game, and the importance level of the replay images saved in the memory unit is set. Next, a second event table used to identify the importance level of the replay images is set. Finally, at least either the latest replay images saved in the memory unit, or the replay images saved in the memory unit in accordance with the importance level thereof, or both, are displayed on the monitor.

Here, the first event table that identifies event content and the importance level thereof, and the second event table that identifies the importance level of the replay images by referencing the first event table, are set. Then, at least either the latest replay images saved in the memory unit, or the replay images saved in the memory unit in accordance with the importance level thereof, or both, will be displayed on the monitor as replay images of an event(s) that occurred during the execution of the game. Thus, at least either the latest replay images, or the replay images saved in the memory unit in accordance with the importance level thereof, or both, can be displayed on the monitor by setting the first event table and the second event table. In other words, it possible to provide a player with replay images without setting a reference value for the replay images.

In a game program in accordance with a second aspect, the first event table setting function and the second event table setting function in the game program in accordance with the first aspect comprise the following functions.

The first event table setting function comprises:

A first event label setting function for setting first event labels that identify event content; and A first label table generating function for generating the first event table comprised of the first event labels, in accordance with the importance level of the event content.

The second event table setting function comprises:

A first replay saving function for saving replay images of an event that occurred during the execution of the game in a first area in a memory unit;

A replay image label setting function for setting a second event label that identifies the content of the replay images to the replay images saved in the first area in the memory unit;

An event label detecting function for detecting whether or not the second event label matches one of the first event labels by sequentially referencing the first event table;

A second label table generating function for setting the importance level of the replay images based on the number of references, and then generating the second event table comprised of the second event label in accordance with the importance level of the replay images if the second event label matches one of the first event labels; and A second replay saving function for saving the second event table and the replay images corresponding to the second event label in the second event table in the second area in the memory unit.

In the event table setting function, the first event label setting function sets the first event labels in order to identify the event content. The first label table generating function generates the first event table comprised of the first event labels in accordance with the importance level of the event content. In addition, in the second event table setting function, the first replay saving function saves the replay images that occurred during the execution of the game in the first area in the memory unit. The replay image label setting function sets the second event label used to identify the content of the replay images to the replay image saved in the first area in the memory unit. The event label detecting function detects whether or not the second event label matches one of the first event labels by sequentially referencing the first event table. The second label table generating function sets the importance level of the replay images, based on the number of references, when a second event label that matches one of the first event labels is detected, and generates the second event table comprised of the second event label in accordance with the importance level of the replay images. The second replay saving function saves the second event table, and the replay images corresponding to the second event label in the second event table, in the second area in the memory unit.

In this case, the first event labels are tabulated in accordance with the importance level of the event content, and thus the first event table is generated. Then, replay images of an event that occurred during the execution of the game is saved in the first area in the memory unit. Next, the first event table is sequentially referenced, and the importance level of the replay images is set, based on the number of references, when the second event label corresponds to one of the first event labels. Then, the second event table is generated by tabulating the second event labels therein in accordance with the importance level of the replay images. Next, the second event table, and the replay images corresponding to the second event labels in the second event table, are saved in the second area in the memory unit. Thus, at least either the latest replay images, or the replay images saved in the memory unit in accordance with the importance level thereof, or both, can be displayed on the monitor by generating the first event table and the second event table and saving the replay images in the first and second areas in the memory unit. In other words, it possible to provide a player with replay images without setting a reference value for the replay images.

In a game program in accordance with a third aspect, the first label table generating function in the game program in accordance with the second aspect generates the first event table by sequentially arranging the first event labels in descending order of importance of the event content. In addition, the event label detecting function sets the number of times in which the first event labels in the first event table are repeatedly and sequentially referenced in descending order of importance of the event content as the number of references. In this case, the event label detecting function sets the number of times in which the first event labels in the first event table are repeatedly and sequentially referenced in descending order of importance of the event content as the number of references. Therefore, a first event label with a smaller number of references corresponds to a higher importance level, and a first event label with a larger number of references corresponds to a lower importance level. In other words, the second label table generating function can set the importance level of the replay images in accordance with the number of references.

In a game program in accordance with a fourth aspect, the first label table generating function in the game program in accordance with the second aspect generates the first event table by sequentially arranging the first event labels in ascending order of importance of the event content. In addition, the event label detecting function sets the number of times in which the first event labels in the first event table are repeatedly and sequentially referenced in descending order of importance of the event content as the number of references. In this case, even if the first label table generating function generates the first event table by arranging the first event labels in ascending order of importance of the event content, the event label detecting function will repeatedly and sequentially reference the first event labels in the first event table in descending order of importance of the event content. Therefore, if the number of times in which the event labels are repeatedly and sequentially referenced is set as the number of references, the event label with the smaller number of references corresponds to an event label with a higher importance level, and the event label with the larger number of references corresponds to an event label with the lower importance level. In other words, the second label table generating function can set the importance level of the replay images in accordance with the number of references.

In a game program in accordance with a fifth aspect, the second label table generating function in the game program in accordance with one of the second to fourth aspects selectively tabulates a predetermined number of second event labels having a high importance level. In this case, the predetermined number of the second event labels with a high importance level are selectively tabulated. Therefore, it is possible to prevent the number of the replay images saved in the memory unit from increasing and prevent the volume of the replay images from filling the free space of the memory unit. In addition, only the replay images corresponding to the second event labels having a high importance level can be preferentially displayed on the monitor.

In a game program in accordance with a sixth aspect, the replay image displaying function in a game program in accordance with one of the second to fifth aspects uses the latest replay images saved in the first area in the memory unit in order to display replay images on the monitor that replays an event that occurred during execution of the game immediately after the event. In this case, the replay images for replaying an event that occurred during the execution of the game are displayed on the monitor immediately after the event by using the latest replay images saved in the first area in the memory unit. Therefore, when the latest replay images are requested, it is possible to provide a player with the latest replay images without setting a reference value to the replay images.

In a game program in accordance with a seventh aspect, the replay image displaying function in a game program in accordance with one of the second to sixth aspects displays replay images on the monitor with the replay images saved in the second area in the memory unit in order to replay highlights of the game. In this case, the replay images for replaying highlights of the game are displayed on the monitor with the replay images saved in the second area in the memory unit. Therefore, when a highlight replay is requested, it is possible to provide a player with the highlight replay without setting a reference value to the replay images.

A game device in accordance with an eighth aspect is a game device for implementing a game in which replay images corresponding to various events can be displayed on a monitor, and comprises a first event table setting means, a second event table setting means, and a replay image displaying means. The first event table setting means sets a first event table in order to identify event content and the importance level thereof. The second event table setting means saves replay images of an event that occurred during the execution of the game in a memory unit, sets the importance level of the replay images saved in the memory unit by referencing the first event table during the execution of the game, and sets a second event table that identifies the importance level of the replay images. A replay image displaying means displays replay images of an event that occurred during the execution of the game by using at least either the latest replay images that are saved in the memory unit, or the replay images that are saved in the memory unit in accordance with the importance level of the replay image, or both.

A game method in accordance with a ninth aspect is a game method for implementing a game in which replay images corresponding to various events can be displayed on a monitor, and comprises a first event table setting step, a second event table setting step, and a replay image displaying step. The first event table setting step sets a first event table in order to identify event content and the importance level thereof. The second event table setting step saves replay images of an event that occurred during the execution of the game in a memory unit, sets the importance level of the replay images saved in the memory unit by referencing the first event table during the execution of the game, and sets a second event table in order to identify the importance level of the replay images. The replay image displaying step displays replay images of an event that occurred during the execution of the game on the monitor by using at least either the latest replay images that are saved in the memory unit, or replay images that are saved in the memory unit in accordance with the importance level of the replay images, or both.

These and other objects, features, aspects and advantages of the present invention will become apparent to those skilled in the art from the following detailed description, which, taken in conjunction with the annexed drawings, discloses a preferred embodiment of the present invention.

DETAILED DESCRIPTION OF THE PREFERRED EMBODIMENTS

Figure 1:
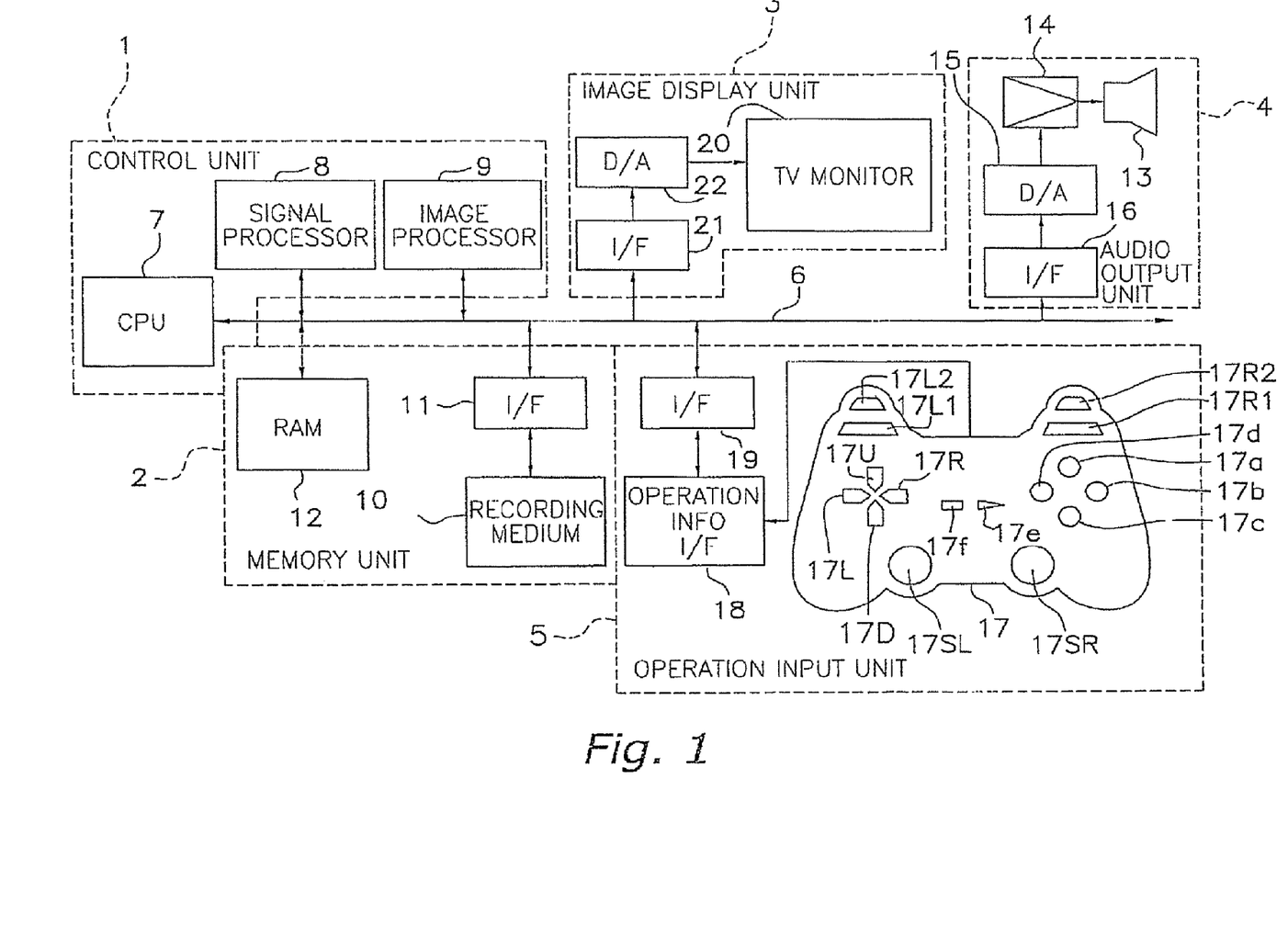
FIG. 1 is a basic block diagram of a game device in accordance with an embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents. Configuration and operation of game device FIG. 1 shows the basic configuration of a game device in accordance with an embodiment of the present invention. As an example of the video game device, a home video game device will be hereinafter explained. The home video game device comprises a home video game console and a home television set. A recording medium 10 can be loaded in the home video game console. Game data is read out of the recording medium 10 and a game is executed. The content of the game executed herewith is displayed on the home television set.

The game system of the home video game device is comprised of a control unit 1, a memory unit 2, an image display unit 3, an audio output unit 4, an operation input unit 5, and each of these units is connected to each other through a bus 6. This bus 6 includes an address bus, a data bus, a control bus, and the like. Here, the control unit 1, the memory unit 2, the audio output unit 4, and the operation input unit 5 are included in the home video game console of the home video game device, and the image display unit 3 is included in the home television set.

The control unit 1 is mainly provided for controlling the progress of the overall game based on the game program. The control unit 1 is comprised of a CPU (Central Processing Unit) 7, a signal processor 8, and an image processor 9, for instance. The CPU 7, the signal processor 8, the image processor 9 are connected to each other through the bus 6. The CPU 7 interprets commands from the game program and performs various types of data processing and data control. For example, the CPU 7 commands the signal processor 8 to provide the image data to the image processor. The signal processor 8 primarily performs computations in three-dimensional space, position conversion computations from the three-dimensional space to a virtual three-dimensional space, a light source computation processing, and data generation and processing of image and audio data. The image processor 9 primarily performs a process to write image data to be rendered to a RAM 12 based on the computation results and processing results of the signal processor 8.

The memory unit 2 is provided mainly for storing the program data, various types of data used for the program data, and the like. The memory unit 2 is comprised of the recording medium 10, an interface circuit 11, and the RAM (Random Access Memory) 12, for instance. The interface circuitry 11 is connected to the recording medium 10. The interface circuitry 11 and the RAM 12 are then connected through the bus 6. The recording medium 10 stores program data of the operation system, game data comprised of image data, audio data, and various types of program data, and the like. For example, this recording medium 10 is a ROM (Read Only Memory) cassette, an optical disk, a flexible disk, or the like. The program data of the operating system, the game data, and the like are stored on this recording medium 10. Note that a card memory is also included in the category of the recording medium 10 and primarily used for storing various game parameters at the point at which the game is interrupted. The RAM 12 is used for temporarily storing various types of data read out of the recording medium 10, and for temporarily recording the processing results from the control unit 1. This RAM 12 is mounted in the interior of the game device and functions as an internal memory unit. In addition to various types of data, address data indicating the memory location of various types of data is stored in the RAM 12, and it is possible to specify an arbitrary address and read and write data from/to the address.

The image display unit 3 is primarily provided for outputting the image data written to the RAM 12 by the image processor 9, the image data read out of the recording medium 10, and the like, as an image. This image display unit 3 is comprised of a television monitor 20, an interface circuit 21, and a D/A converter (digital-to-analog converter) 22, for instance. The D/A converter 22 is connected to the television monitor 20, and the interface circuit 21 is connected to the D/A converter 22. In addition, the bus 6 is connected to the interface circuit 21. Here, the image data is provided to the D/A converter 22 through the interface circuit 21, and is converted into an analog image signal. Then, the analog image signal is output to the television monitor 20 as an image.

The audio output unit 4 is primarily provided for outputting the audio data read out of the recording medium 10 as audio. The audio output unit 4 is comprised of a speaker 13, an amplifier circuit 14, a D/A converter 15, and an interface circuit 16, for instance. The amplifier circuit 14 is connected to the speaker 13. The D/A converter 15 is connected to the amplifier circuit 14. The interface circuit 16 is connected to the D/A converter 15. In addition, the bus 6 is connected to the interface circuit 16. Here, the audio data is provided to the D/A converter 15 through the interface circuit 16 and is converted into an analog audio signal. The analog audio signal is amplified by the amplifier circuit 14 and output as audio by the speaker 13. ADPCM (Adaptive Differential Pulse Code Modulation) data, PCM (Pulse Code Modulation) data, and the like are included in the category of the audio data, for instance. In the case of the ADPCM data, the audio can be output by the speaker 13 with the same type of processing method as described above. In the case of the PCM data, if the PCM data is converted to the ADPCM data in the RAM 12, the audio can be output by the speaker 13 with the same type of processing method as described above.

The operation input unit 5 is primarily comprised of a controller 17, an operation information interface circuit 18, and an interface circuit 19. The operation information interface circuit 18 is connected to the controller 17, and the interface circuit 19 is connected to the operation information interface circuit 18. In addition, the bus 6 is connected to the interface circuit 19.

The controller 17 is an operation unit used for the input of various operation commands by the video game player and transmits operation signals to the CPU 7 in accordance with the video game player's operation. A first button 17a, a second button 17b, a third button 17c, a fourth button 17d, an up key 17U, a down key 17D, a left key 17L, a right key 17R, a L1 button 17L1, a L2 button 17L2, a R1 button 17R1, a R2 button 17R2, a start button 17e, a select button 17f, a left stick 17SL, and a right stick 17SR are provided with the controller 17.

The up key 17U, the down key 17D, the left key 17L, and the right key 17R are used to provide the CPU 7 with commands which cause the characters and a cursor to move up, down, left, and right on the screen of the television monitor 20, for instance.

The start button 17e is used to command the CPU 7 to load the game program from the recording medium 10, and the like.

The select button 17f is used for commanding the CPU 7 to execute various selections with respect to the game program loaded from the recording medium 10, for instance.

The left stick 17SL and the right stick 17SR are stick-shaped controllers with approximately the same constitution as a so-called joystick. This stick-shaped controller includes a upright stick. This stick is configured to be able to incline from the upright position and rotate 360 degrees around the fulcrum, including the front, back, left, and right directions. The left stick 17SL and the right stick 17SR transmit x and y coordinate values with the origin being the upright position to the CPU 7 through the operation information interface circuit 18 and the interface circuit 19 as the operation signal in accordance with the direction and angle of incline of the stick.

Various functions are allocated to the first button 17a, the second button 17b, the third button 17c, the fourth button 17d, the L1 button 17L1, the L2 button 17L2, the R1 button 17R1, and the R2 button 17R2 in accordance with the game program that is loaded from the recording medium 10.

Note that each button and each key provided with the controller 17 other than the left stick 17SL and the right stick 17SR are configured to function as ON/OFF switches that turn on when pressed from the neutral position by external pressure and turn off when the pressure is released and then return to the neutral position.

The general operations of the home video game device configured as described above will be hereinafter explained. When a power switch (not shown in the figure) is turned on and the game system is powered on, the CPU 7 reads out image data, audio data, and program data from the recording medium 10 based on the operating system stored in the recording medium 10. All or part of the read-out data including the image data, the audio data, and the program data are stored in the RAM 12. Then, the CPU 7 issues commands for the image data and the audio data, both of which are stored in the RAM 12, based on the program data stored in the RAM 12.

In the case of image data, the signal processor 8 first performs a positional computation, a light source computation, and the like for a character in the three-dimensional space based on the command from the CPU 7. Next, the image processor 9 writes the image data to be rendered to the RAM 12 based on the computation results by the signal processor 8. Then, the image data written to the RAM 12 is provided to the D/A converter 22 through the interface circuit 21. Here, the image data is converted into an analog image signal by the D/A converter 17. Then, the image data is provided to the television monitor 20 and displayed as an image.

In the case of the audio data, the signal processor 8 first generates and processes audio data based on a command from the CPU 7. Here, processing such as pitch conversion, noise addition, envelope setting, rank setting, and reverb addition is performed for the audio data. Next, the audio data is output from the signal processor 8 and provided to the D/A converter 15 through the interface circuit 16. Here, the audio data is converted into an analog audio signal. Then, the audio data is output as audio by the speaker 13 through the amplifier circuit 14.

Various Means in the Game Device

Figure 2:
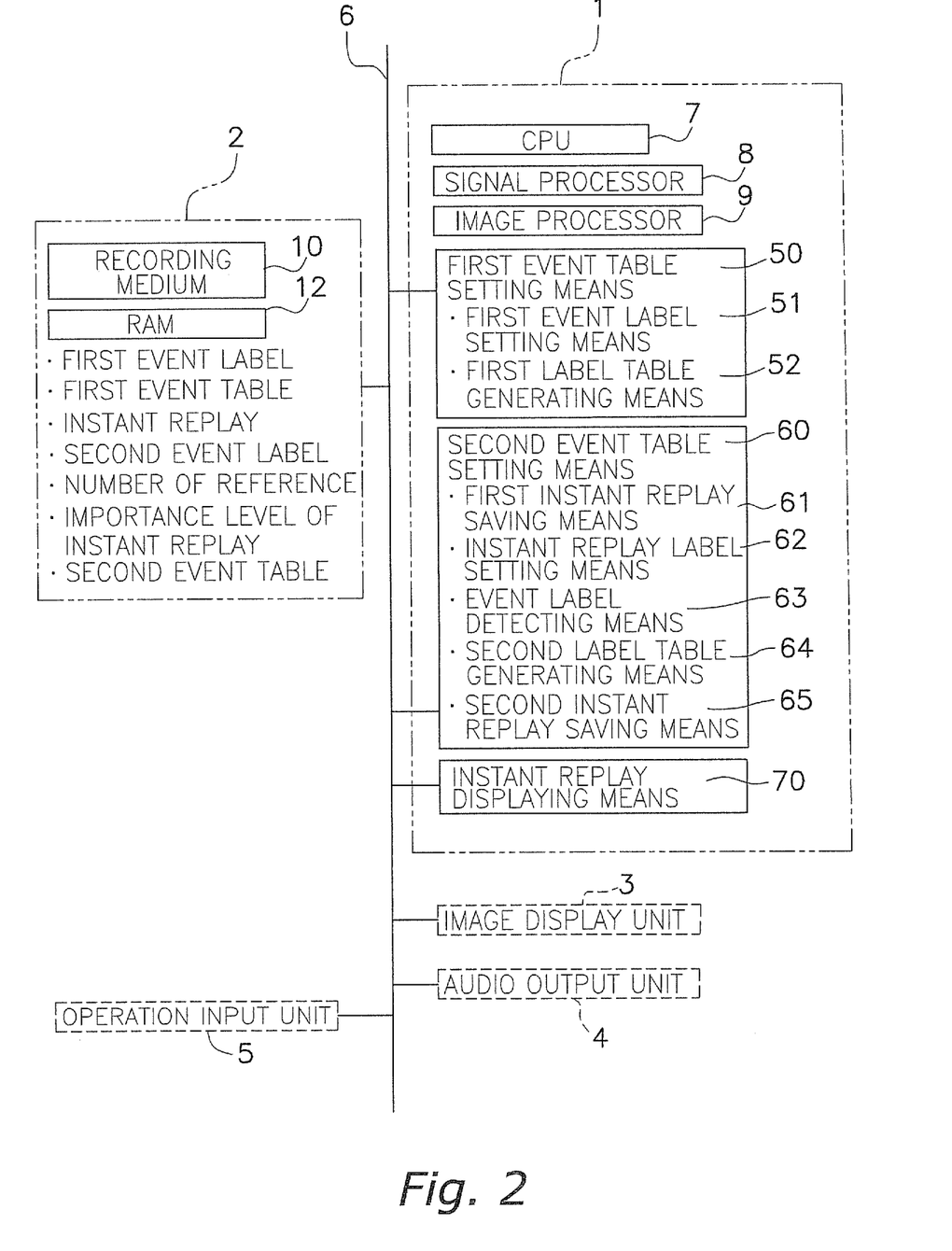
FIG. 2 is a functional block diagram for explaining means primarily controlled by a control unit shown in FIG. 1.

FIG. 2 is a functional block diagram primarily for explaining means controlled by the control unit 1 shown in FIG. 1. Various means that play a primary role in the present invention will be explained with reference to the functional block diagram.

The present game device serves to implement a game in which replay images corresponding to various events can be displayed on the television monitor 20, and comprises first event table setting means 50, second event table setting means 60, and replay image displaying means 70.

The first event table setting means 50 is means for implementing a function which sets a first event table in order to identify event content and the importance level of event content. The first event table setting means 50 sets the first event table in the memory unit 2, and the first event table is used so that the control unit 1 can identify event content that is controlled and executed by the control unit 1 during execution of the game, and identify the importance level of event content during execution of the game.

The first event table setting means 50 with this configuration comprises first event label setting means 51 and first label table generating means 52.

The first event label setting means 51 is a means for implementing a function which sets first event labels in order to identify event content. The first event label setting means 51 sets a first event label corresponding to each event content in the memory unit 2 in order to identify event content that is controlled and executed by the control unit 1 during execution of the game.

The first label table generating means 52 is a means for implementing a function which generates a first event table comprised of the first event labels in accordance with the importance level of event content. The first label table generating means 52 in the control unit 1 generates the first event table comprised of the first event labels in the memory unit 2. At this time, the control unit 1 rearranges the order of the first event labels in the first event table in descending order of the importance of the event content.

The second event table setting means 60 is a means for implementing a function to save replay images of an event that occurred during the execution of the game in the memory unit 2, set the importance level of the replay images saved in the memory unit 2 by referencing the first event table during execution of the game, and set a second event table used to identify the importance level of the replay images. The second event table setting means 60 saves the replay images of an event that occurred during the execution of the game in the memory unit 2. Then, the first event table is referenced during the execution of the game, and the importance level of the replay images saved in the memory unit 2 is set. Furthermore, the second event table is set in the memory unit 2.

The second event table setting means 60 with this configuration comprises first replay image saving means 61, replay image label setting means 62, event label detecting means 63, second label table generating means 64, and second replay image saving means 65.

The first replay image saving means 61 is a means for implementing a function which saves the replay images of an event that occurred during the execution of the game in a first area of the memory unit 2. The first replay image saving means 61 saves the replay images of an event that occurred during the execution of the game in the first area of the memory unit 2.

The replay image label setting means 62 is a means for setting a second event label to the replay images saved in the first area of the memory unit 2 in order to identify the content of the replay image. The replay image label setting means 62 in the control unit 1 sets the second event label used to identify the content of the replay image to the replay images saved in the first area of the memory unit 2.

The event label detecting means 63 is a means for detecting if a second event label corresponds to one of the first event labels by sequentially referencing the first event table. The event label detecting means 63 in the control unit 1 sequentially references the first event table, and then detects if the second event label of the replay images corresponds to one of the first event labels in the first event table. At this time, the number of times in which the control unit 1 repeatedly and sequentially references the first event labels in the first event table in descending order of the importance of the event content is set in the memory unit 2 as the number of references.

The second label table generating means 64 is a means for setting the importance level of the replay images, based on the number of references, if a second event label corresponding to one of the first event labels is detected, and generates a second event table comprised of second event labels in accordance with the importance level of the replay images. The second label table generating means 64 in the control unit 1 sets the importance level of the replay images, based on the number of references, if a second event label corresponding to one of the first event labels is detected. Then, the control unit 1 generates the second event table comprised of second event labels in the memory unit 2 in accordance with the importance level of the replay images. At this time, a predetermined number of second event labels having a high importance level is selectively tabulated in the second event table by the control unit 1.

The second replay image saving means 65 is a means for implementing a function which saves the second event table and the replay image corresponding to one of the second event labels in the second event table in a second area in the memory unit 2. The second replay image saving means 65 saves the second event table and the replay image corresponding to one of the second event labels in the second event table in the second area in the memory unit 2.

The replay image displaying means 70 is a means for implementing a function which displays, on the television monitor 20, at least either the latest replay images to be saved in the memory unit 2, or the replay images saved in the memory unit 2 in accordance with the importance level of the replay images, or both. The replay image displaying means 70 displays at least either the latest replay images to be saved in the memory unit 2, or the replay images saved in the memory unit 2 in accordance with the importance level of the replay images, on the television monitor 20, or both. At this time, the replay images for replaying an event that occurred during the execution of the game are displayed on the television monitor 20 by using the latest replay images saved in the first area of the memory unit 2 immediately after the event occurred. In addition, replay images for replaying highlights of the game can be displayed on the television monitor 20 by using the replay images saved in the second area of the memory unit 2.

Method for Executing Various Game Functions

Figure 3:
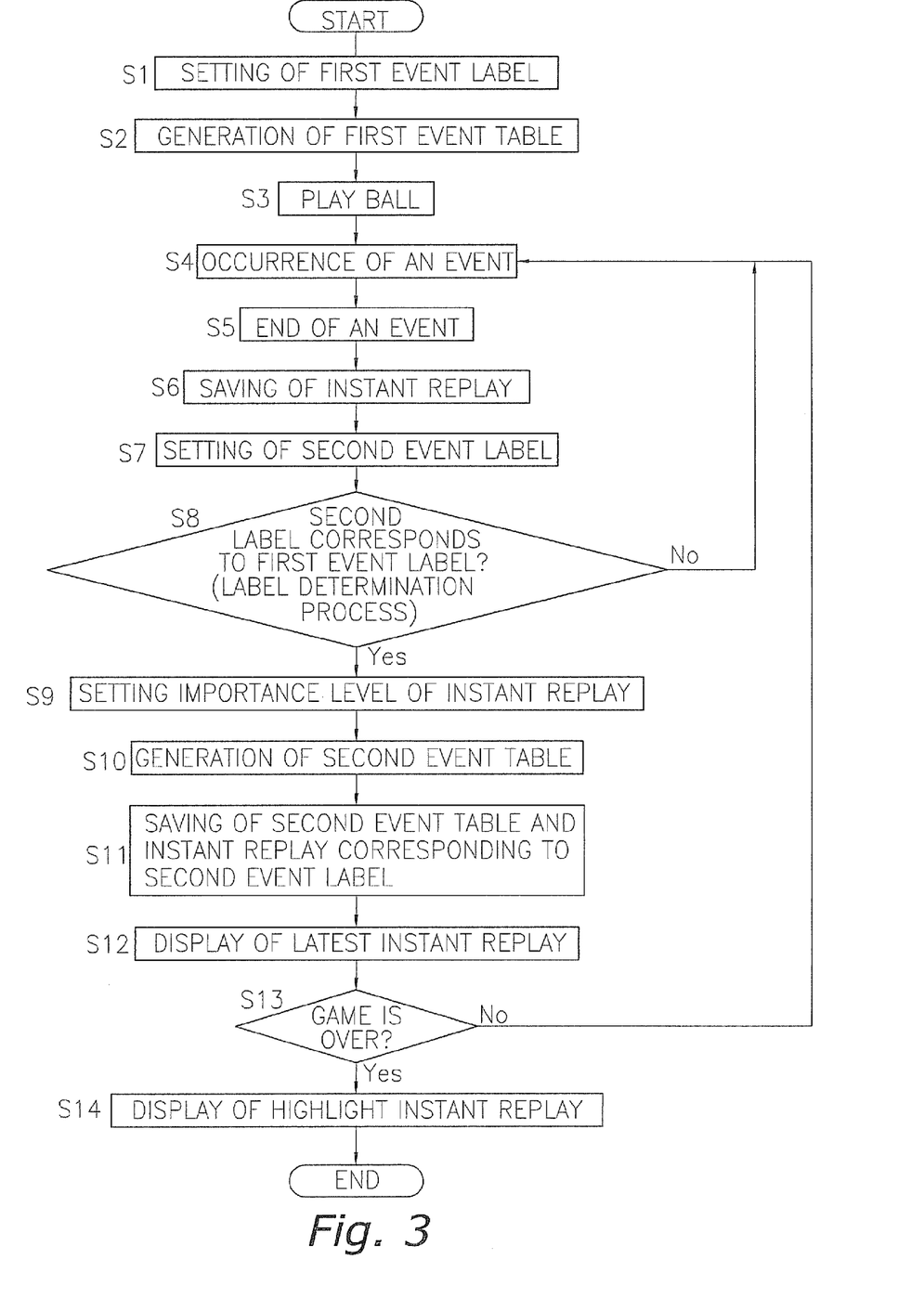
FIG. 3 is a flow chart for explaining the execution of various means in a game device.

The general execution of various functions of the game in accordance with the present embodiment will be explained with reference to the flow charts shown in FIGS. 3 and 4. An example is described herein in which various functions are executed in a game, such as a baseball video game, in which replay images corresponding to various events can be displayed on the television monitor 20.

In a baseball video game in which replay images corresponding to various events, i.e., various plays, can be displayed on the television monitor 20, a game program stored in the recording medium 10 or the RAM 12 will be loaded, and a boot screen will be displayed on the television monitor 20, when the recording medium 10 is put in the video game console and the main power supply is turned on.

Figure 5:
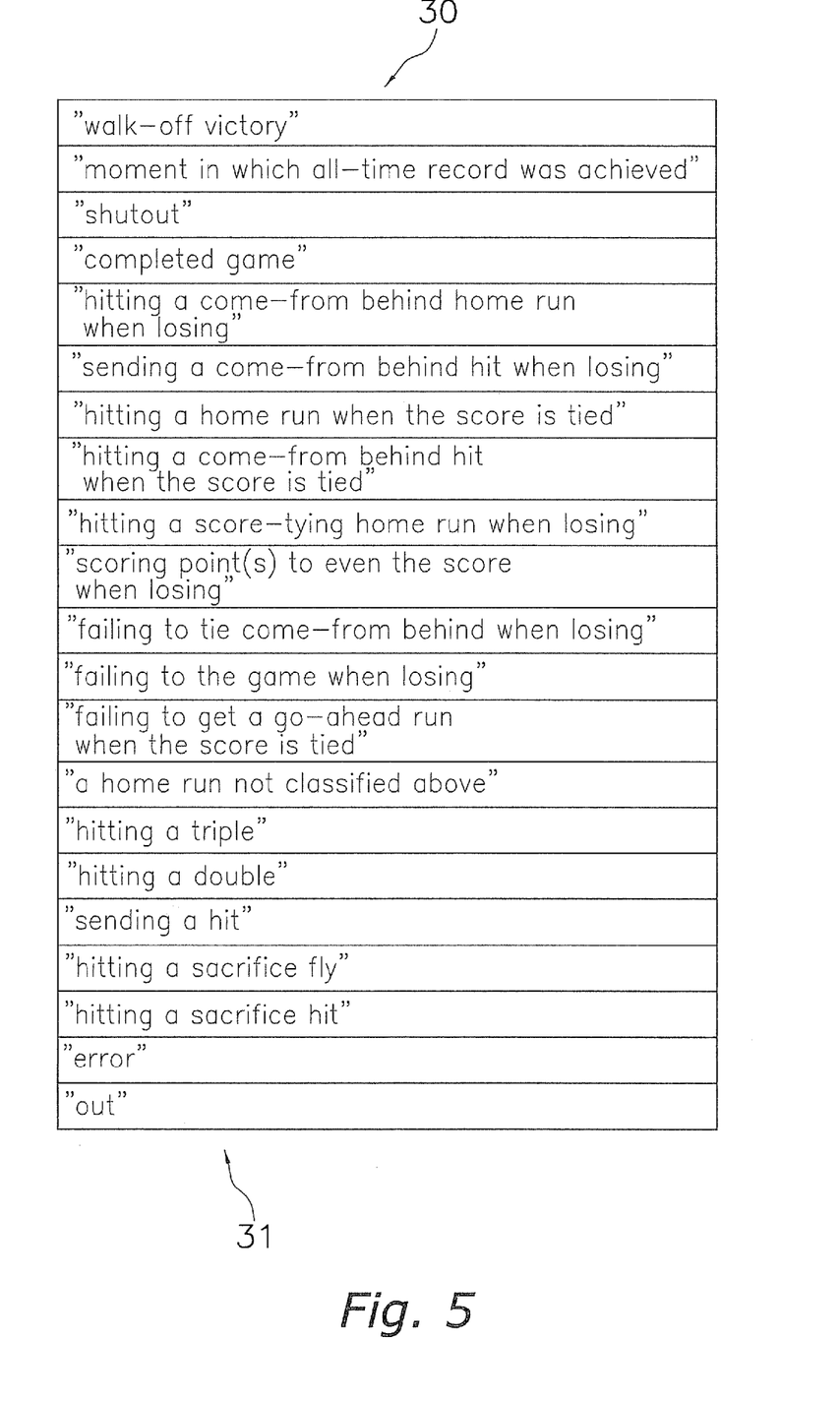
FIG. 5 is a diagram for explaining a first event table.

At this time, a first event table 30 is preconfigured in the RAM 12. The first event table 30 is used when the control unit 1 identifies event content that is controlled and executed by the control unit 1 during execution of the game, and identifies the importance level of this event content during the execution of the game. Here, as a first step, a first event label 31 that corresponds to the content of each event is read out from the recording medium 10 and set in the RAM 12 so that the control unit 1 can identify the event content that is controlled and executed by the control unit 1 during execution of the game (Step S1). For example, as shown in FIG. 5, 21 kinds of labels are prepared as first event labels 31, which includes "walk-off victory", "moment in which all-time record was achieved", "shutout", "completed game", "hitting a come-from behind home run when losing", "hitting a come- from-behind hit when losing", "hitting a home run when the score is tied", "hitting a come-from-behind hit when the score is tied", "hitting a score-tying home run when losing", "scoring point(s) in order to even the score when losing", "failing to come from behind when losing," "failing to tie the game when losing," "failing to hit a go-ahead run when the score is tied," "a home run not classified above," "hitting a triple," "hitting a double," "hitting a single," "hitting a sacrifice fly," "hitting a sacrifice hit," "error," "out," and the like. Next, the control unit 1 generates the first event table 30 comprised of the first event labels 31 in accordance with the importance level of the event content (Step S2). At this time, as shown in FIG. 5, the control unit 1 rearranges the order of the first event labels 31 in the first event table 30 in descending order of the importance of the event content. For example, as shown in FIG. 5, the order of the first event labels 31 is rearranged in the first event table 30 in descending order of the importance of the event content. Thus, the first event table 30 comprised of the first event labels 31 is set, and the control unit 1 controls and starts the baseball video game after the video game player completes various default settings before the start of the baseball video game (Step S3). After the start of the baseball video game, the baseball video game is executed by the player's operation of the controller 17. Thus, the control unit 1 executes various events, that is, various plays in accordance with the pace of the game (Steps S4 and S5).

Every time the control unit 1 executes an event during the baseball video game, i.e., a play, replay images of the play are saved in the first area of the RAM 12 (Step S6). For example, during the baseball video game, a series of actions performed from the home plate umpire's declaration of the start of a play until the end of the play are saved in the first area in the RAM 12 as replay images of an event, i.e., replay images of a play. For example, a play corresponds to a series of actions in which the pitcher starts throwing a ball and then the catcher catches the ball, a series of actions in which a pitcher starts throwing a ball, then the batter hits a home run, and finally the batter and one or more runners on base cross the plate, and the like. Every time a play occurs during the game, the replay images that were previously saved in the first area in the RAM 12 are rewritten with new replay images, and the new replay images are saved in the first area in the RAM 12. Next, the control unit 1 sets a second event label 41, used to identify the content of the replay images, to the replay images saved in the first area in the RAM 12 (Step S7). For example, the 21 labels noted above, including "walk-off victory", "moment in which all-time record was achieved", "shutout", "completed game", "hitting a come-from behind home run when losing", "hitting a come-from-behind hit when losing", "hitting a home run when the score is tied", "hitting a come-from-behind hit when the score is tied", "hitting a score-tying home run when losing", "scoring point(s) in order to even the score when losing", "failing to come from behind when losing," "failing to tie the game when losing," "failing to hit a go-ahead run when the score is tied," "a home run not classified above," "hitting a triple," "hitting a double," "hitting a single, " "hitting a sacrifice fly," "hitting a sacrifice hit," "error," "out," and the like, and in addition, labels other than these that correspond to various plays, are prepared as the second event labels 41.

Next, the control unit 1 sequentially references the first event table 30, and detects whether or not the second event label 41 that was set to the replay images corresponds to one of the first event labels 31 in the first event table 30. In other words, the control unit 1 sequentially references the first event table 30, and executes a label determination process in order to detect whether the second event label 41 that was set to the replay images corresponds to one of the first event labels 31 in the first event table 30.

Figure 4:
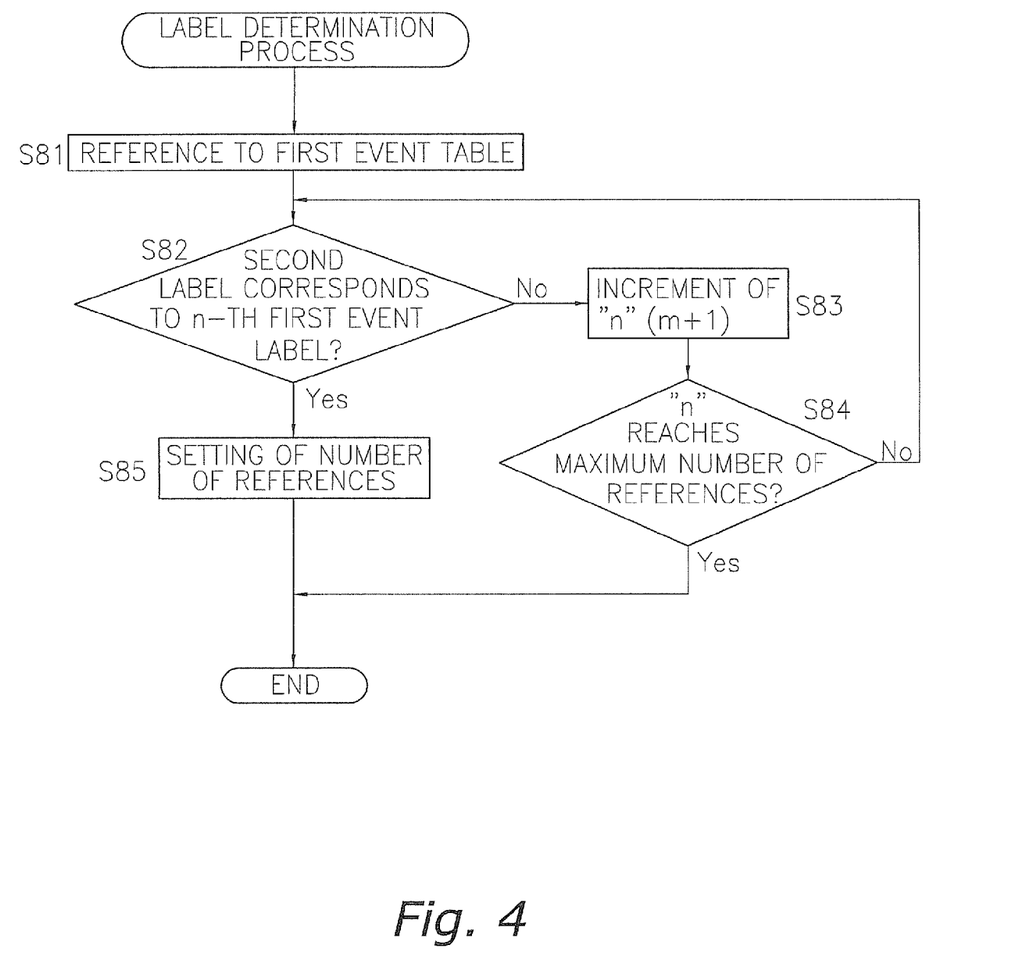
FIG. 4 is a flow chart for explaining the execution of a label discrimination process in a game device.

As shown in FIG. 4, in the label determination process, the number of times in which the control unit 1 repeatedly and sequentially references the first event labels 31 in the first event table 30 in descending order of importance of the event content is set in the RAM 12 as the number of references n. In this label determination process, the control unit 1 repeatedly and sequentially refers to the first event labels 31 in the first event table 30 in descending order of importance of the event content (Step S81). For example, the first to the twenty-first labels of the first event label 31 are sequentially referenced one by one from the top to the bottom of the first event table 30 shown in FIG. 5 in order to determine whether the second event label 41 corresponds to one of the first event labels 31 in the first event table 30. Then, the control unit 1 determines whether the n-th first event label 31 matches the second event label 41 (Step S82). If the n-th first event label 31 does not match the second event label 41 (No in Step S82), the number of references n is sequentially incremented by one until the second event label 41 matches one of the first event labels 31. Thus, the number of references n can be sequentially changed from "2" to "22 (the maximum number of references)" (Step S83). Then, it is determined whether or not the incremented number of references n has reached the maximum number of reference "22" (Step S84). Unless the incremented number of references n has reached the maximum number of reference "22" (No in Step S84), steps S82 to S84 are repeatedly executed. Then, if the number of references n has reached the maximum number of references (Yes in Step S84), the label determination process is completed. The case in which the label determination process is thus completed corresponds to the case in which a second event label 41 that matches one of the first event labels 31 was not detected (No in Step S8). At this time, the control unit 1 moves to the next event execution process without reflecting the second event label 41 in the second event table 40 (Step S4).

On the other hand, in the label determination process, if the control unit 1 repeatedly and sequentially references the first event labels 31 in the first event table 30 in descending order of importance of the event content (Step S81), and the n-th first event label 31 matches the second event label 41 (Yes in Step S82), the number of references n is set (Step S82). Here, the number of references n at which a first event label 31 matches the second event label 41 is set to be "n." For example, if the second event label 41 is "hitting a come-from behind home run when losing," the first event label 31 in the first event table 30 which matches "hitting a come-from behind home run when losing," is arranged as the fifth label in the first event table 30, as shown in FIG. 5. Therefore, the number of references n is set to be "5," and this "5" is saved in the RAM 12 as the number of references n. In the same way, if the second event label 41 is "failing to come from behind when losing," the first event label 31 in the first event table 30 which matches "failing to come from behind when losing" is arranged as the eleventh label in the first event table 30, as shown in FIG. 5. Therefore, the number of references n is set to be "11," and this "11" is saved in the RAM 12 as the number of references n. In the same way, if the second event label 41 is "failing to get a go-ahead run when the score is tied," the first event label 31 in the first event table 30 which matches "failing to get a go-ahead run when the score is tied," is arranged as the thirteenth label in the first event table 30, as shown in FIG. 5. Therefore, the number of references n is set to be "13," and this "13" is saved in the RAM 12 as the number of references n. Thus, if the number of references n is set, the label determination process is completed. This case corresponds to the case in which a second event label 41 that matches one of the first event labels 31 was detected (Yes in Step S8).

Figure 6:
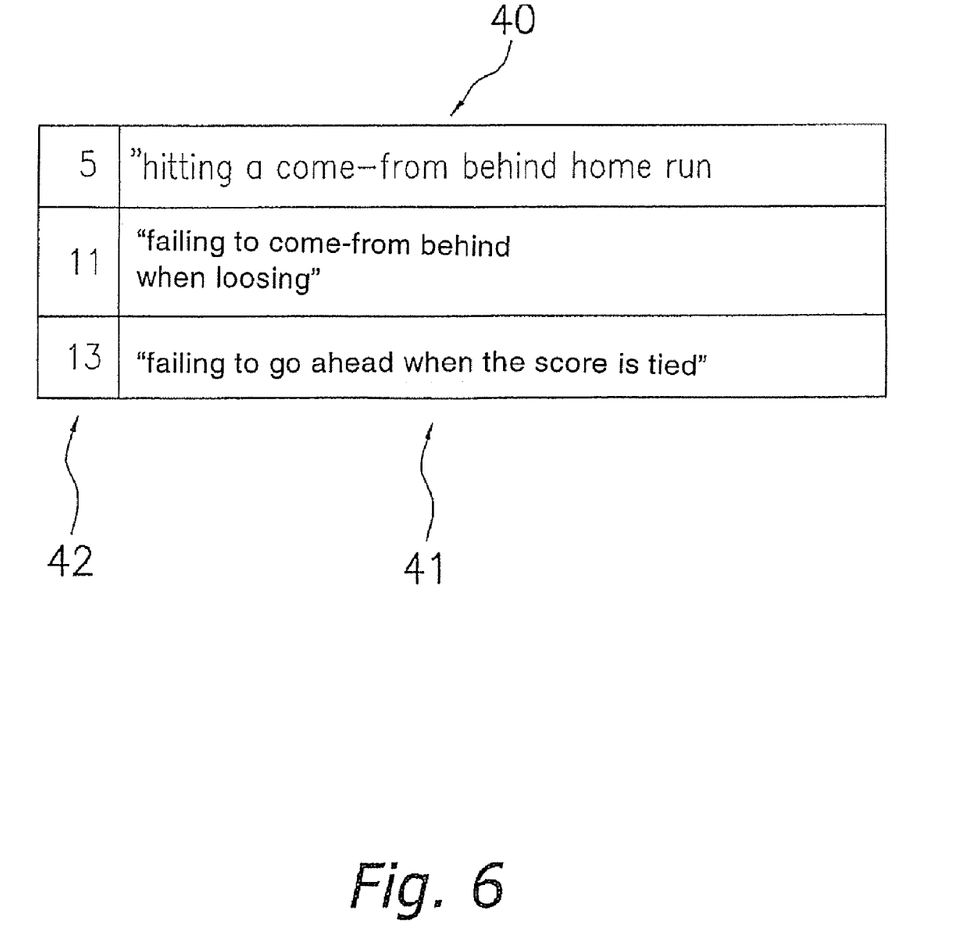
FIG. 6 is a diagram for explaining a second event table.

If a second event label 41 matching one of the first event labels 31 was detected (Yes in Step S8), the control unit 1 sets the importance level 42 of the replay images based on the number of references n (Step S9). Here, the importance level 42 set to the replay images is determined by the number of references n. For example, the importance level 42 is determined to be higher as the number of references n becomes smaller. On the other hand, the importance level 42 is determined to be lower as the number of references n becomes larger. For example, if the second event label 41 that matches one of the first event labels 31 is "hitting a come-from behind home run when losing," the number of references n is "5." Thus, "5" is set to the replay images as the importance level 42. In the same way, if the second event label 41 matching one of the first event labels 31 is "failing to come from behind when losing," the number of references n is "11." Thus, "11" is set to the replay images as the importance level 42. In the same way, if the second event label 41 that matches the first event label 31 is "failing to get a go-ahead run when the score is tied," the number of references n is "13." Thus, "13" is set to the replay images as the importance level 42. Next, the second event table 40 that is comprised of the second event labels 41 is generated in the RAM 12 in accordance with the importance level 42 of the replay images (Step S10). At this time, a predetermined number of second event labels 41 having a high importance level 42 is selectively tabulated in the second event table 40 by the control unit 1. In other words, even if the second event labels 41 are increasingly generated as the baseball video game is executed, a predetermined number of second event labels 41 having a high importance level 42 will be selectively tabulated in the second event table 40. At this time, if a second event label 41 with an importance level that is higher than that of a second event label 41 with the lowest importance level 42 is generated, the selection of the second event label 41 in the second event table 40 will be implemented by replacing the second event label 41 with the lowest importance level 42 with the second event label 42 with an importance level 42 that is higher than the lowest importance level 42. For example, as shown in FIG. 6, if the predetermined number of the second event labels 41 is three, the second event table 40 includes "hitting a come-from behind home run when losing" with the importance level 42 of "5", "failing to come from behind when losing" with the importance level 42 of "11", and "failing to get a go-ahead run when the score is tied" with the importance level "13", and "walk-off victory" with an importance level 42 that is higher than that of "failing to get a go-ahead run when the score is tied" with the lowest importance level 42 occurs during the execution of the baseball video game, "failing to get a go-ahead run when the score is tied" with the importance level 42 of "13" will be displaced by the second event label 41 of "walk-off victory" with an importance level 42 of "1" in the second event table 40. Note that if the number of the second event labels 41 in the second event table 40 is fewer than the predetermined number, second event labels 41 are sequentially added to the second event table 40 until the number of the second event labels 41 in the second event table 40 reaches the predetermined number. The second event table 40 set herewith and the replay images corresponding to the second event labels 41 in the second event table 40 are saved in the second area in the RAM 12. Then, replay images for replaying an event that occurred during the execution of the game are displayed on the television monitor 20 by using the latest replay images saved in the first area of the RAM 12 immediately after the event occurred (Step S12).

The above described process is repeatedly executed every time an event, i.e., a play, occurs until the game is over (No in Step S13). When the game is over (Yes in Step S13), the replay images for replaying highlights of the game are displayed on the television monitor 20 by using the replay images saved in the second area of the RAM 12 (Step S14). At this time, the second event table 40 whose predetermined number of second event labels 41 is three, and the replay images corresponding to the second event labels 41 in the second event table 40, are saved in the second area in the RAM 12. Therefore, the replay images corresponding to three second event labels 41 are displayed on the television monitor 20 as the highlight replay images.

In the present embodiment, the first event table 30 that identifies event content and identifies the importance level thereof, and the second event table 40 that identifies the importance level 42 of the replay images by referencing the first event table 30, are set. Then, the replay images saved in the first area in the RAM 12, and the replay images corresponding to the second event labels 41 saved in the second area in the RAM 12, are displayed on the television monitor 20 as the latest replay images and the highlight replay images of the events that occurred during the execution of the game. Thus, the latest replay images and the highlight replay images can be displayed on the television monitor 20 by setting the first event table 30 and the second event table 40. In other words, it is possible to provide a player with the latest replay images and highlight replay images without setting a reference value to the replay images. In addition, a predetermined number of second event labels 41 having high importance levels 42 are selectively tabulated in the event table, and accordingly, it will be possible to prevent the number of replay images saved in the RAM 12 from increasing and the volume of the replay images from filling the free space of the RAM 12. Furthermore, the replay images corresponding to the second event labels 41 with a higher importance level 42 can be preferentially displayed on the television monitor 20.

Other Embodiments (a) The present invention includes a program for executing the above described method and a computer-readable recording medium 10 on which this program is recorded. For example, a computer-readable flexible disk, a semiconductor memory, a CD-ROM, a DVD, a MO disk, a ROM cassette, and the like can be suggested as the recording medium 10.

(b) In the above described embodiment, a case in which the game device of the present invention is applied to a home game device was described. However, the game device is not limited to the above described embodiment and can be applied to an arcade game device in which the television monitor 20 is integrated, a personal computer that functions as the game device when a game program is executed therein, a workstation, and the like as well.

(c) In the above described embodiment, an example was described in which the first event labels 31 in the first event table 30 are sequentially arranged in descending order of importance of the event content. However, the event labels 31 may be sequentially arranged in ascending order of importance of the event content. Thus, even if the order in which the first event labels 31 in the first event table 30 are arranged is inverted, it is possible to detect if the second event label 41 matches one of the first event labels 31 with the same method as in the above described embodiment by repeatedly and sequentially referencing the first event labels 31 in the first event table 30 in descending order of the importance level of the event content.

(d) In the above described embodiment, an example was described in which the predetermined number of second event labels 41 in the second event table 40 is three. However, the predetermined number of the second event labels 41 is not limited to the above described embodiment, and may be any number.

(e) In the above described embodiment, a case was described in which a highlight replay is displayed on the television monitor 20 after the game is over. However, the highlight replay corresponding to various events that occurred before an event occurred during the execution of the game may be displayed immediately after the event occurred during the execution of the game.

(f) In the above described embodiment, a case was described in which the latest replay image and the highlight replay images can be simultaneously displayed on the television monitor 20. However, the display of the replay images is not limited to the above described embodiment, and only the latest replay images or only the highlight replay images may be displayed on the television monitor 20.

According to the present invention, the first event table for identifying the event content and identifying the importance level thereof, and the second event table for identifying the importance level of replay images by referencing the first event table, are set. Then, at least either the latest replay images saved in the memory unit, or the replay images saved in the memory unit in accordance with the importance level of the replay images, will be displayed on the monitor as replay images of an event(s) that occurred during the execution of the game. Thus, at least either the latest replay images, or the replay images saved in the memory unit in accordance with the importance level thereof, or both, can be displayed on the monitor by setting the first event table and the second event table. In other words, it possible to provide a player with replay images without setting a reference value to the replay images. Here, replay images for replaying an event that occurred during the execution of the game are displayed on the monitor by using the latest replay images saved in the first area in the memory unit immediately after the event occurred. Therefore, when the latest replay images are requested, it is possible to provide a player with the latest replay images without setting a reference value to the replay images. In addition, the replay images saved in the memory unit in accordance with the importance levels thereof, that is, the replay images for replaying highlights of the game, are displayed on the monitor with the replay images saved in the second area in the memory unit. Therefore, when the highlight replay images are requested, it is possible to provide a player with highlight replay images without setting a reference value to the replay images. Furthermore, a predetermined number of second event labels with high importance levels are selectively tabulated. Therefore, it is possible to prevent the number of the replay images saved in the memory unit from increasing and prevent the volume of the replay images from filling the free space of the memory unit. In addition, only the replay images corresponding to the second event labels with the high importance levels can be preferentially displayed on the monitor.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Moreover, terms that are expressed as "means-plus function" in the claims should include any structure that can be utilized to carry out the function of that part of the present invention. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A computer readable medium storing a game program for a video game in which replay images corresponding to various events are displayed on a monitor, the game program comprising:
   code for setting by the control unit a first event table containing events being predicted to occur during the course of the video game and a first importance level being predetermined on the video game;
code for executing an event by a control unit, the event occurring on the course of the video game;
code for determining by the control unit whether or not the event occurring on the course of the video game is same as one of the events defined on the first table;
code for identifying by the control unit a second importance level of the event as the first importance level by referring to the first event table, if the event occurring on the course of the video game is same as one of the events defined on the first event table;
code for setting by the control unit a second event table containing a replay image of the event occurring on the course of the video game and the second importance level, the replay image and the second importance level being saved in the memory unit; and
code for displaying on the monitor at least one of the latest replay image of the latest event and the replay image in the second event table on the basis of how high the second importance level is,
the code for setting the first event table including
code for setting a first event label in order to identify the event, and
code for generating the first event table including the first event label in accordance with the first importance level,
the code for setting the second event table including
code for saving the replay image in a first area in a memory unit,
code for setting a second event label that identifies content of the replay image,
code for detecting whether or not the second event label matches the first event label by increasing the first importance level on the first event table one by one from the lowest to the highest,
code for setting the second importance level based on how many times the first importance level on the first event table is increased,
code for unchanging the second importance level if the second event label does not match the first event label between the lowest and the highest on the first event table,
code for generating the second event table in accordance with the second importance level, if the second event label matches the first event label, and
code for saving the second event table, and the replay image in the second area in the memory unit.

2. The computer readable medium according to claim 1, wherein
the first event table contains a second event defined on the table having a third importance level with a third event label identifying the second event defined on the table,
the code for setting the first event table includes code for identifying the highest of the first importance level and the third importance level by sequentially arranging the first event label and the third event label in a descending order of the first importance level and the third importance level, and
code for detecting whether or not the second event label matches the first event label by referencing the first event table includes code for setting the number of times in which the first table is referenced as the number of times in which the first event label and the third event label labels in the first event table are sequentially referenced in the descending order.

3. The computer readable medium according to claim 1, wherein
the first event table contains a second event defined on the table having a third importance level with a third event label identifying the second event defined on the table,
the code for setting the first event table includes code for identifying the highest of the first importance level and the third importance level by sequentially arranging the first event label and the third event label in an ascending order of the first importance level and the third importance level, and
code for detecting whether or not the second event label matches the first event label by referencing the first event table includes code for setting the number of times in which the first table is referenced as the number of times in which the first event label and the third event label labels in the first event table are sequentially referenced in the descending order.

4. The computer readable medium according to claim 1, wherein
code for setting the second importance level includes code for selectively tabulating the second event label.

5. The computer readable medium according to claim 1, wherein
code for displaying on the monitor at least one of the latest replay image of the latest event and the replay image in the second event table includes code for using the latest replay image saved in a first area in the memory unit in order to display on the monitor immediately after the latest event, if the latest replay image is selected to display.

6. The computer readable medium according to claim 1, wherein
code for displaying on the monitor at least one of the latest replay image of the latest event and the replay image in the second event table includes code for using the replay image saved in the second area in the memory unit as a highlight of the game.

7. A game device for implementing a video game in which replay images corresponding to various events including an event executed in the game displayed, comprising:
a control unit configured to execute an event occurring on the course of the video game, the control unit including
a first event table setting unit configured to set a first event table containing events being predicted to occur during a course of the video game and a first importance level being predetermined on the video game, and
a second event table setting unit configure to determine whether or not the event occurring on the course of video game is same as one of the events defined on the first event table, identify a second importance level of the event as the first importance level by referencing to the first event table, if the event occurring on the course of the video game is same as one of the events defined on the first event table, and set a second event table containing a replay image of the event occurring on the course of the video game and the second importance level; and
a replay image displaying unit configured to display at least one of the latest replay image of the latest event and the replay image in the second event table on the basis of how high the second importance level is,
the first event table setting unit being configured to set a first event label in order to identify the event, and to generate the first event table including the first event label in accordance with the first importance level, the second event table setting unit configured to save the replay image in a first area in a memory unit, to set a second event label that identifies content of the replay image, to detect whether or not the second event label matches the first event label by increasing the first importance level on the first event table one by one from the lowest to the highest, to set the second importance level based on how many times the first importance level on the first event table is increased, to unchanged the second importance level if the second event label does not match the first event label between the lowest and the highest on the first event table, to generate the second event table in accordance with the second importance level, if the second event label matches the first event label, and to save the second event table, and the replay image in the second area in the memory unit.

8. A method for implementing a video game in a computer in which replay images corresponding to various events are displayed on a monitor, comprising:

setting by a control unit a first event table containing events being predicted to occur during a course of the video game and a first importance level being predetermined on the video game;

executing by the control unit an event occurring during the course of the video game;

determining by the control unit whether or not the event occurring on the course of the video game is same as one of the events defined on the first event table;

identifying by the control unit a second importance level of the event as the first importance level by referencing to the first event table, if the event occurring on the course of the video game is same as one of the events defined on the first event table;

setting by the control unit the first importance level of the replay images saved in a memory unit by referencing the first event table during execution of the game;

setting by the control unit a second event table containing the replay image of the event occurring on the course of the video game and the second importance level, the replay image and the second importance level being saved in the memory unit; and displaying on the monitor at least one of the latest replay image of the latest event and the replay image in the second event table on the basis of how high the second importance level is, the setting by the control unit the first event table including setting a first event label in order to identify the event, and generating the first event table including the first event label in accordance with the first importance level, the setting by the control unit the second event table including saving the replay image in a first area in a memory unit, setting a second event label that identifies content of the replay image, detecting whether or not the second event label matches the first event label by increasing the first importance level on the first event table one by one from the lowest to the highest, setting the second importance level based on how many times the first importance level on the first event table is increased, unchanging the second importance level of the second event label does not match the first event label between the lowest and the highest on the first event table, generating the second event table in accordance with the second importance level, if the second event label matches the first event label, and saving the second event table, and the replay image in the second area in the memory unit.

* * * * *